(12) United States Patent
Desai et al.

(10) Patent No.: US 9,009,777 B2
(45) Date of Patent: Apr. 14, 2015

(54) AUTOMATIC ROLE ACTIVATION

(75) Inventors: Saurabh Desai, Austin, TX (US); Niteesh Kumar Dubey, Yorktown Heights, NY (US); Yantian Tom Lu, Round Rock, TX (US); Ravi A. Shankar, Austin, TX (US); Murali Vaddagiri, Karnataka (IN); Drew Thomas Walters, Austin, TX (US); Xinya Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1955 days.

(21) Appl. No.: 11/565,249

(22) Filed: Nov. 30, 2006

(65) Prior Publication Data

US 2008/0134320 A1 Jun. 5, 2008

(51) Int. Cl.
*G06F 21/00* (2013.01)
*G06F 21/30* (2013.01)
*G06F 21/62* (2013.01)

(52) U.S. Cl.
CPC ............ *G06F 21/30* (2013.01); *G06F 21/6218* (2013.01)

(58) Field of Classification Search
CPC ..................................................... G06F 21/30
USPC ....... 726/1, 2, 3, 4, 6, 16, 17, 18, 21
See application file for complete search history.

(56) References Cited

U.S. PATENT DOCUMENTS

| | | | |
|---|---|---|---|
| 5,911,143 A * | 6/1999 | Deinhart et al. .......... 707/103 R |
| 6,161,139 A * | 12/2000 | Win et al. ..................... 709/225 |
| 6,574,736 B1 | 6/2003 | Andrews |
| 7,284,000 B2 * | 10/2007 | Kuehr-McLaren et al. ...... 707/9 |
| 2002/0026592 A1 * | 2/2002 | Gavrila et al. ................. 713/201 |
| 2002/0095571 A1 | 7/2002 | Bradee |
| 2002/0111892 A1 * | 8/2002 | Sharp et al. ..................... 705/37 |
| 2002/0144142 A1 * | 10/2002 | Shohat ........................... 713/200 |
| 2002/0147801 A1 * | 10/2002 | Gullotta et al. ............... 709/223 |
| 2002/0156904 A1 * | 10/2002 | Gullotta et al. ............... 709/229 |
| 2002/0184250 A1 * | 12/2002 | Kern et al. ..................... 707/204 |
| 2003/0037263 A1 * | 2/2003 | Kamat et al. .................. 713/202 |

(Continued)

OTHER PUBLICATIONS

Ferraiolo et al.; Proposed NIST standard for role-based access control; Published in: Journal ACM Transactions on Information and System Security (TISSEC); TISSEC Homepage archive vol. 4 Issue 3, Aug. 2001; pp. 224-274; ACM Digital Library.*

(Continued)

*Primary Examiner* — Bradley Holder
(74) *Attorney, Agent, or Firm* — Yee & Associates, P.C.; Parashos Kalaitzis

(57) ABSTRACT

A method, apparatus, and computer usable program product for automatic activation of roles is provided. When a user initiates an action, a set of roles needed for the action is identified. A set of roles assigned to the user is also identified. From the two sets of roles, all roles that are common to both sets are identified in a subset of roles. Roles in this subset are assigned to the user and are sufficient for the action. One or more roles from this subset of roles is selected for activation depending on system policies in effect. Selected roles are automatically activated without requiring any intervention from the user. Once the selected roles are activated, they can become inactive upon completion of the current action, or remain active for subsequent actions by the user during all or part of a user session. System policies can decide how the roles are selected for activation, and the duration of which the roles remain active once activated.

20 Claims, 2 Drawing Sheets

(56) References Cited

U.S. PATENT DOCUMENTS

2003/0229623 A1\* 12/2003 Chang et al. .................. 707/3
2005/0138419 A1\* 6/2005 Gupta et al. ................ 713/201
2007/0214497 A1\* 9/2007 Montgomery et al. .......... 726/4

OTHER PUBLICATIONS

Chadwick et al.; Role-based access control with X.509 attribute certificates; Published in: Internet Computing, IEEE vol. 7, Issue: 2 ) pp. 62-69; Date of Publication : Mar./Apr. 2003; IEEE Xplore.\*

Obelheiro et al., "Role-Based Access Control for CORBA Distributed Object Systems", Proceedings of the Seventh International Workshop on Object-Oriented real-Time Dependable Systems (WORDS 2002), IEEE 2002, pp. 1-8.

Cheng, "An Object-Oriented Organizational Model to Support Dynamic Role-Based Access Control in Electronic Commerce Applications", Proceedings of the 32nd Hawaii International Conference on System Sciences—1999, IEEE 1999, pp. 1-9.

Barkley et al., "Role-Based Accessed Control for the Web," Proceedings of CALS Expo International and 21st Century Commerce 1998: Global Business Solutions for the New Millennium, Oct. 1998, 10 pages.

\* cited by examiner

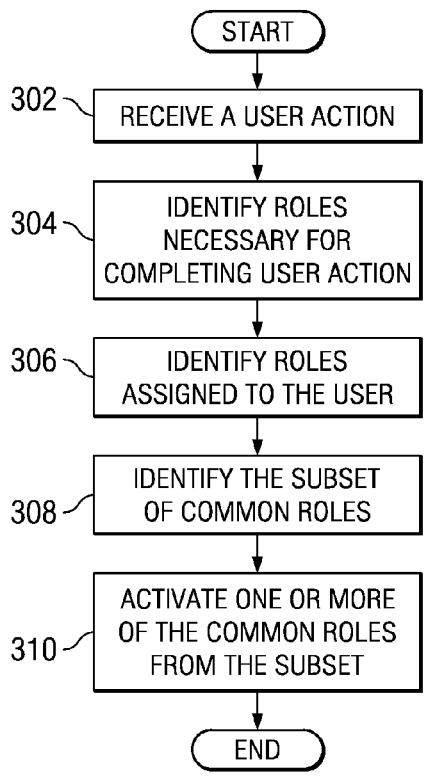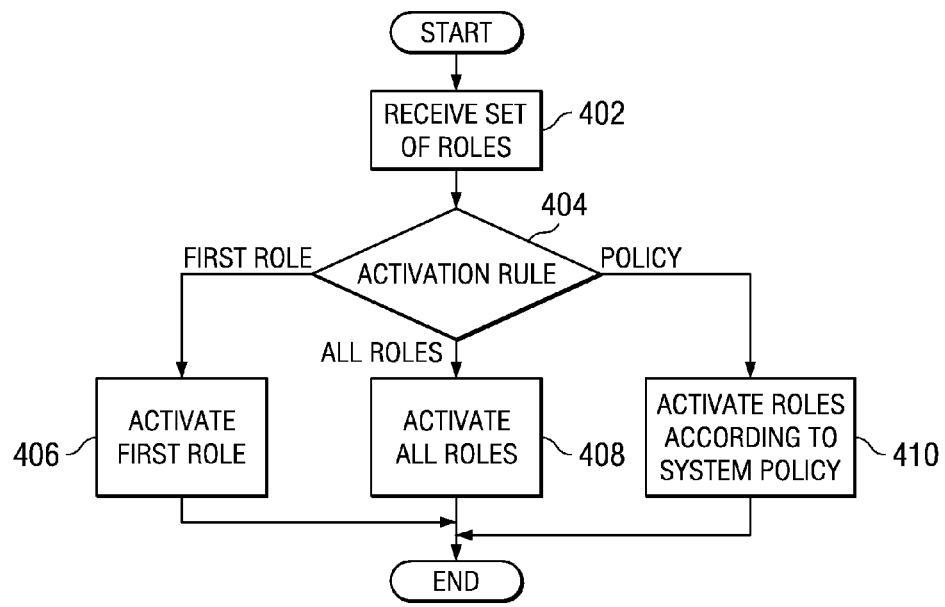

AUTOMATIC ROLE ACTIVATION

BACKGROUND OF THE INVENTION

1. Field of the Invention

The present invention relates generally to an improved data processing system, and in particular, to a computer implemented method and apparatus for role based access control. Still more particularly, the present invention is related to a computer implemented method and apparatus for automatic activation of roles in a role based access control system.

2. Description of the Related Art

Several kinds of security measures are implemented in data processing systems for preventing unauthorized access to data, applications, or other information. One of the security measures pertains to allowing only users with proper authority to run certain applications or execute certain commands.

In a data processing system, the abilities of users are determined by the roles assigned to the users. A user can be assigned multiple roles. The data processing system evaluates a user's roles in order to determine the authority of the user for performing certain functions. For example, one user may be assigned the role of system administrator, and another user may be assigned a guest role. The data processing system will allow the user with a system administrator role to open operating system files and manipulate roles of other users. In this sense, the data processing system will allow broader access to the user with the system administrator role. On the other hand, the data processing system may only allow the user with the guest role to access public information and access to the Internet, but no access to operating system files or any applications that manipulate roles of other users.

Other roles can be created as needed in a particular data processing system. For example, all users have at least a role of "user", which implies that the user is an authorized user of the data processing system and has some access to the applications and commands available in the data processing system.

A user may be assigned multiple roles. The user may assume one of the assigned roles when needed, such as to perform a task, run an application, or execute a certain command. Role activation is the assumption of an assigned role and is required before the user can perform the task, run the application, or execute the command.

SUMMARY OF THE INVENTION

Illustrative embodiments provide a computer implemented method, apparatus, and computer usable program product for automatically activating roles for a user. When a user initiates an action, a set of roles needed for the action is identified. A set of roles assigned to the user is also identified. A subset of roles that includes all roles common to the two sets of roles is identified. A role from this subset of roles is automatically activated without requiring any user input to activate the role.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a flowchart of the process for automatic role activation for a user in accordance with an illustrative embodiment; and FIG. 4 is a flowchart of a process for selecting the role for automatic activation in accordance with an illustrative embodiment.

DETAILED DESCRIPTION OF THE PREFERRED EMBODIMENT

Figure 1:
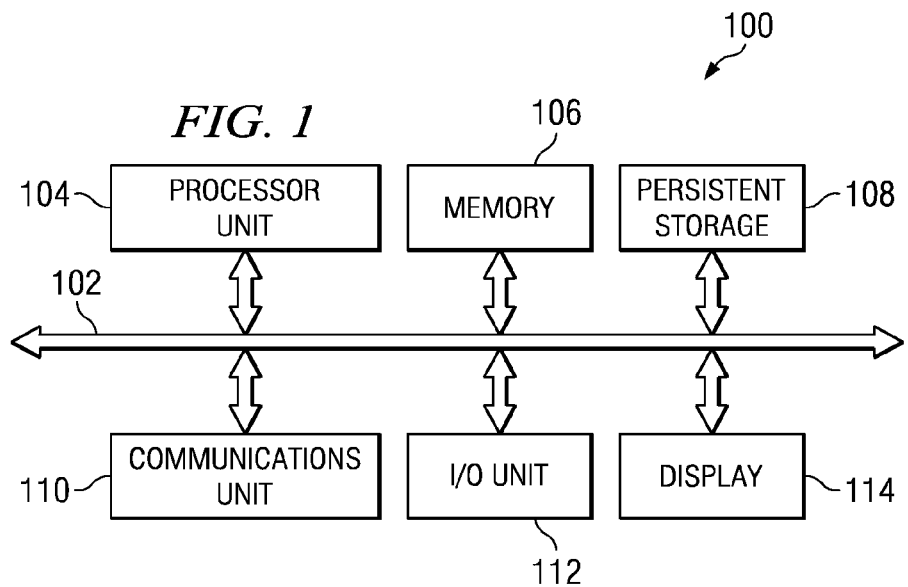
FIG. 1 is a block diagram of a data processing system in accordance with an illustrative embodiment.

With reference now to the figures and in particular with reference to FIG. 1, a block diagram of a data processing system is depicted in accordance with an advantageous embodiment of the present invention. In this illustrative example, data processing system 100 includes communications fabric 102, which provides communications between processor unit 104, memory 106, persistent storage 108, communications unit 110, I/O unit 112, and display 114.

Processor unit 104 serves to execute instructions for software that may be loaded into memory 106. Processor unit 104 may be a set of one or more processors or may be a multi-processor core, depending on the particular implementation. Further processor unit 206 may be implemented using one or more heterogeneous processor systems in which a main processor is present with secondary processors on a single chip. Memory 106, in these examples, may be, for example, a random access memory. Persistent storage 108 may take various forms depending on the particular implementation. For example, persistent storage 108 may be, for example, a hard drive, a flash memory, a rewritable optical disk, a rewritable magnetic tape, or some combination of the above.

Communications unit 110, in these examples, provides for communications with other data processing systems or devices. In these examples, communications unit 110 is a network interface card. I/O unit 112 allows for input and output of data with other devices that may be connected to data processing system 100. For example, I/O unit 112 may provide a connection for user input though a keyboard and mouse. Further, I/O unit 112 may send output to a printer. Display 114 provides a mechanism to display information to a user.

Instructions for the operating system, the object-oriented programming system, and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106.

FIG. 1 is intended as an example, and not as an architectural limitation for different embodiments. The hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 106 or a cache such as found in a north bridge, which is a memory controller hub that controls the communication between the random access memory, graphics processor, PCI bus, and the processor. A processing unit may include one or more processors or central processing units (CPUs). The depicted examples in FIG. 1 and above-described examples are not meant to imply architectural limitations. For example, data processing system 100 also may be a tablet computer, a laptop computer, or a telephone device.

Presently, a user is responsible for knowing which roles are needed for a particular user action. The user is also responsible for activating the appropriate roles, in the correct order and in a timely manner, for the user action to complete successfully. Alternatively, a system administrator is sometimes responsible for the selection and activation of the roles for a user.

Illustrative embodiments recognize that such user and administrator dependent activation is a time consuming and error prone process. The time consumed by a user in selecting and activating roles is generally longer than the time needed to perform these actions by an automatic process. Further, illustrative embodiments also recognize that the user based selection and activation can result in the activation of incorrect roles. Incorrect role activation can result in the failure of a user action. Incorrect role activation can also open unnecessary access for malicious or unintended actions in the data processing system.

Illustrative embodiments provide a method, apparatus, and computer usable program product for automatic role activation to overcome the problems recognized above. Automatic role activation according to the illustrative embodiments is faster and more accurate that role activation by the user or administrator. Automatic role activation also reduces the possibility of human errors such as incorrect role activation or accidental role activation. Therefore, automatic role activation is useful in preventing malicious and unintended actions in the data processing system.

Figure 2:
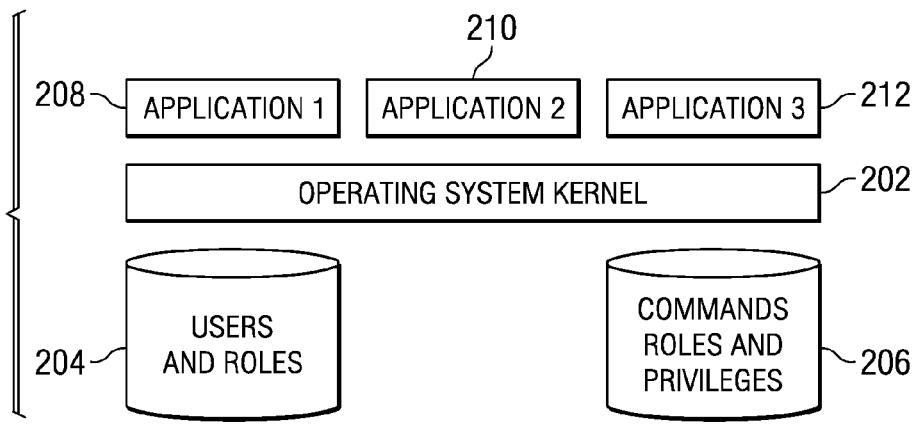
FIG. 2 is a block diagram of software components in a data processing system is shown in accordance with an illustrative embodiment.

With reference now to FIG. 2, a block diagram of software components in a data processing system, such as data processing system 100 in FIG. 1, is shown in accordance with an illustrative embodiment. Operating system kernel 202 is an essential component of an operating system that provides support for core operating system services, such as input/output access and task scheduling.

Users-and-roles database 204 is a listing of one or more authorized users on a data processing system, and their assigned roles. Commands-roles-and privileges database 206 is a listing of the various commands available on the data processing system, the roles required to execute those commands, and privileges under which those commands execute. Roles and privileges are described in further detail in the following paragraph. In a given data processing system, databases 204 and 206 can exist in the form of flat files, encrypted files, tables in a database, or other forms usable by the operating system used in the data processing system.

A user is identified by a user identification known as user ID. A privilege is a low level permission required to perform a privileged operation in an operating system kernel. An example of privileged operation is the modification of system time. Privileges are used to override security restrictions in the operating system kernel. Some examples of privileges are, ability to change ownership of any file on the file system, ability to configure network adapters, and ability to load kernel extensions. A process including any of these operations must have the corresponding privilege.

A command may perform certain privileged operations. The operating system may require certain privileges to be available in the process that is trying to execute the command. Based on the role of the user who is executing the command, certain privileges are assigned to the command. For example, assume that a role A can be used to control the execution of command A and command B. Command A running under role A could require a privilege A, but a command B running under role A could require privilege B as well as privilege C.

A user has roles, and a command requires privileges to run. A user starts a process when the user executes a command with an appropriate role activated. The command then runs under the process with appropriate privilege from the activated role.

Each of applications 208-210 can be a software application that requires a user to have certain roles before the user can run the application. For example, one such application can be a database application that accesses confidential financial information of a company's customers, which requires that the user trying to access the database have a customer service role.

Any number of applications, such as applications 208-210, can be loaded on the data processing system. Furthermore, an application can be a component of the operating system in which the application is used for performing an operating system specific function such as user administration. Each of the software components depicted in FIG. 2 can be loaded into a storage device, such as, for example, main memory 106 in FIG. 1, persistent storage 108 in FIG. 1, an on-board cache of processor unit 104 in FIG. 1, or a combination of the these storage devices. The software components may be loaded onto other types of storage devices in other implementations. Furthermore, additional software components may be loaded in a data processing system, but are not shown in FIG. 2 for the sake of clarity.

With reference now to FIG. 3, a flowchart of the process for automatic role activation for a user is depicted in accordance with an illustrative embodiment. The process can be implemented in a software application, such as application 208 in FIG. 2, which can be loaded in the main memory of a data processing system, such as main memory 106 in FIG. 1.

The process begins by receiving a user action for executing a command, running an application, or performing a task, that requires a specific role to be activated (step 302). These types of user actions are collectively referred to as user action here. Activation of a role is the process of enabling a role that is already assigned to the user for completing a user action.

The process checks the database containing the correlation of various commands, roles, and privileges, such as commands-roles-and-privileges database 206 in FIG. 2, to identify the various roles that are authorized for the user action (step 304). Next, the process checks the database containing the correlation of users and their roles, such as users-and-roles database 204 in FIG. 2, to determine if the user is assigned any of the roles identified in step 304 (step 306).

Next, the process identifies the roles that are common to the roles identified for the action and the roles identified as being assigned to the user (step 308). One or more roles may be common to the roles identified in steps 304 and 306, resulting in a set of common roles. This set of common roles contains one or more roles and is the subset of roles that are assigned to the user, and that are sufficient for completing the user action. Any one or more of these common roles, when activated by the process, will allow the user to complete the user action. The process of determining which of these common roles to activate is described in FIG. 4 below.

Once the set of common roles is identified in step 308, one or more common roles from the set are activated for the user (step 310). The process ends thereafter.

Once activated, a role can remain active for subsequent user actions that also require that role to be active. These subsequent user actions may or may not be the same action that first activated the role.

Furthermore, once activated, a role can remain active for the duration of a user session even if the process that first caused the role to be activated terminates. A user session is a series of activities that a user can perform on a data processing system once the data processing system has granted access to the user, without requiring further grant of access to the user. Once a user session ends, the user typically has to be granted a new access before the user can perform any activities on the data processing system. An example of a user session is a computer login using a login identification and password. During a user session, a user may execute several commands, each of which may require certain roles to be activated. An implementation of automatic role activation may provide that if a role is activated for one command, and the role is also required by another command, the role need not be activated a second time for all or part of the user session.

With reference now to FIG. 4, a flowchart of a process for selecting the role for automatic activation is depicted in accordance with an illustrative embodiment. The process begins by receiving a set of roles that have been identified (step 402). This set of roles in step 402 is identified by a process, such as the process in FIG. 3. The set roles are one or more roles that are common between each role assigned to the user and each role required to complete the user action.

The process determines which role to activate based on activation rule (step 404). One exemplary activation rule can result in activation of the first role in the set ("first role" path of step 404). The process activates the first role from the set of common roles and terminates thereafter (step 406).

Alternatively, another exemplary activation rule can result in activation of all roles in the set ("all roles" path of step 404). The process activates all roles from the set of common roles and terminates thereafter (step 408).

Alternatively, another exemplary activation rule can apply a system policy in determining which roles should be activated ("policy" path of step 404). For example, a system policy may be that the user must have been assigned all the roles that can execute a command, and not just one of those roles, and that all such roles must be activated for the user before the user can execute that command. The process activates appropriate roles from the set of common roles as determined by the system policy and terminates thereafter (step 410).

A system policy can also be that a role B cannot be activated if role A is already active. This particular system policy is referred to as dynamic separation of duties (DSD). Thus, the illustrative embodiments can be used for enforcing dynamic separation of duties as well.

System policies described above are only described as illustrative examples and are not intended to be limiting on the illustrative embodiment. Additionally, these methods of selecting roles for automatic activation are also exemplary and not limiting on the illustrative embodiments. Other examples of system policies and many more methods of selection will become apparent to those of ordinary skill in the art from this disclosure.

Thus, the illustrative embodiments describe a method and system by which appropriate roles can be selected and automatically activated for a user. In the manner described above, the role activation process becomes transparent to the user. The method and system of the illustrative embodiments remove the need for the user or someone else, such as a system administrator, to select and activate the needed roles so that the user can perform the user action.

The automation of role identification and activation make the overall execution of the user action faster and less prone to errors caused by incorrect role activation. The automatic role activation is also useful for running scheduled tasks on a data processing system. For example, a daily reboot of the data processing system can be scheduled by a user. As described above, the appropriate roles can be automatically activated at the scheduled time without requiring the user to be present.

The illustrative embodiment can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an (i) electronic, magnetic, optical, electromagnetic, infrared, or semiconductor system (or apparatus or device) storage medium, or (ii) a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the illustrative embodiment has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatically activating roles for a user, the computer implemented method comprising:
by a processor:
responsive to an action being initiated by the user, identifying each role needed to perform the action to form a first set of roles;
responsive to the identifying of each role needed to perform the action, identifying each role assigned to the user initiating the action to form a second set of roles;
responsive to the identifying of each role assigned to the user initiating the action, forming a subset of roles comprising each role present in both the first set of roles and the second set of roles; and
responsive to the forming of the subset of roles, activating a role from the subset of roles by the user assuming the role from the subset of roles that the user is assigned to, wherein the action initiated by the user is performed by using the role, wherein the role is automatically activated without requiring an input from the user for selecting the role, wherein abilities of the user to perform actions are determined by the roles assigned to the user such that authority of the user to perform a particular action at a particular point in time is based upon what particular role of the roles is assigned to the user at the particular point in time.

2. The computer implemented method of claim 1, wherein the first set of roles is stored in one of a database table, a flat file, an encrypted file, and a directory, forming a first store, wherein the first store is loaded into an operating system kernel, and wherein a plurality of records in the first store comprises:
a name of a command that corresponds to the action being initiated by the user;
at least one required role that must be activated to run the command that corresponds to the action being initiated by the user; and
at least one privilege that is associated with a process where the command will run, wherein the at least one privilege is a permission required to perform a privileged command in the operating system kernel.

3. The computer implemented method of claim 2, wherein the second set of roles is stored in one of a database table, a flat file, an encrypted file, and a directory, forming a second store, wherein the second store is loaded into the operating system kernel, and wherein a plurality of records in the second store comprises:
a user id corresponding to the user; and
at least one user role assigned to the user id.

4. The computer implemented method of claim 2, wherein the role that is activated from the subset of roles is one of a first role in the subset of roles, each role in the subset of roles, and based on a system policy.

5. The computer implemented method of claim 2, wherein the action is scheduled to run at a predetermined time.

6. The computer implemented method of claim 2, wherein once the role is activated, the role remains active if the action is initiated again.

7. The computer implemented method of claim 2, wherein the role that is activated from the subset of roles is each role in the subset of roles that is present in both the first set of roles and the second set of roles.

8. The computer implemented method of claim 2, wherein the role that is activated from the subset of roles that is present in both the first set of roles and the second set of roles is selected based on a system policy.

9. The computer implemented method of claim 2, wherein the first set of roles comprises all roles that are necessary for completing the action initiated by the user.

10. The computer implemented method of claim 9, wherein the step of forming the subset of roles comprises determining if the user is assigned to any roles in the first set of roles.

11. A computer usable program product for automatically activating roles for a user, the computer usable program product embodied on a non-transitory computer readable storage medium comprising:
computer usable program code stored on the computer readable storage medium for identifying each role needed to perform a user-initiated action to form a first set of roles, wherein the user-initiated action is an action to be performed by a data processing system that is initiated by a user of the data processing system;
computer usable program code stored on the computer readable storage medium, responsive to the computer usable program code for identifying each role needed to perform the user-initiated action, for identifying each role assigned to the user initiating the action to form a second set of roles;
computer usable program code stored on the computer readable storage medium for forming a subset of roles comprising each role present in both the first set of roles and the second set of roles; and
computer usable program code stored on the computer readable storage medium for activating a role from the subset of roles by the user assuming the role from the subset of roles that the user is assigned to, wherein the action initiated by the user is performed by using the role, wherein the role is automatically activated without requiring an input from the user for selecting the role, wherein the role that is activated from the subset of roles is one of a first role in the subset of roles, each role in the subset of roles, and based on a system policy, and wherein once the role is activated, the role remains active for one of if the action is initiated again, and a current session, wherein abilities of the user to perform actions are determined by the roles assigned to the user such that authority of the user to perform a particular action at a particular point in time is based upon what particular role of the roles is assigned to the user at the particular point in time.

12. The computer usable program product of claim 11, wherein the role that is activated from the subset of roles is each role in the subset of roles that is present in both the first set of roles and the second set of roles.

13. The computer usable program product of claim 11, wherein the role that is activated from the subset of roles that is present in both the first set of roles and the second set of roles is selected based on a system policy.

14. The computer usable program product of claim 11, wherein the first set of roles comprises all roles that are necessary for completing the action initiated by the user.

15. The computer usable program product of claim 14, wherein the computer usable program code stored on the computer readable storage medium for forming the subset of roles comprises computer usable program code stored on the computer readable storage medium for determining if the user is assigned to any roles in the first set of roles.

16. A data processing system for automatically activating roles for a user, the data processing system comprising:
- a storage device, wherein the storage device stores computer usable program code; and
- a hardware processor, wherein the processor executes the computer usable program code stored in the storage device, and wherein the computer usable program code comprises:
- computer usable program code for identifying each role needed to perform a user-initiated action to form a first set of roles, wherein the user-initiated action is an action to be performed by a data processing system that is initiated by a user of the data processing system;
- computer usable program code, responsive to the computer usable program code for identifying each role needed to perform the user-initiated action, for identifying each role assigned to the user initiating the action to form a second set of roles;
- computer usable program code for forming a subset of roles comprising each role present in both the first set of roles and the second set of roles; and
- computer usable program code for activating a role from the subset of roles by the user assuming the role from the subset of roles that the user is assigned to, wherein the action initiated by the user is performed by using the role, wherein the role is automatically activated without requiring an input from the user for selecting the role, wherein the role that is activated from the subset of roles is one of a first role in the subset of roles, each role in the subset of roles, and based on a system policy, and wherein once the role is activated, the role remains active for one of if the action is initiated again, and a current session, wherein abilities of the user to perform actions are determined by the roles assigned to the user such that authority of the user to perform a particular action at a particular point in time is based upon what particular role of the roles is assigned to the user at the particular point in time.

17. The data processing system of claim 16, wherein the role that is activated from the subset of roles is each role in the subset of roles that is present in both the first set of roles and the second set of roles.

18. The data processing system of claim 16, wherein the role that is activated from the subset of roles that is present in both the first set of roles and the second set of roles is selected based on a system policy.

19. The data processing system of claim 16, wherein the first set of roles comprises all roles that are necessary for completing the action initiated by the user.

20. The data processing system of claim 19, wherein the computer usable program code for forming the subset of roles comprises computer usable program code for determining if the user is assigned to any roles in the first set of roles.

* * * * *